US012776564B2

(12) United States Patent
Fluck et al.

(10) Patent No.: US 12,776,564 B2
(45) Date of Patent: Oct. 27, 2026

(54) ELECTRICAL MEDICAL DEVICE COMPRISING AN ANTENNA

(71) Applicant: Aesculap AG, Tuttlingen (DE)

(72) Inventors: Simon Fluck, Blumberg (DE); Thomas Maser, Zimmern ob Rottweil (DE); Juergen Schneider, Tuttlingen (DE)

(73) Assignee: Aesculap AG, Tuttlingen (DE)

( * ) Notice: Subject to any disclaimer, the term of this patent is extended or adjusted under 35 U.S.C. 154(b) by 60 days.

(21) Appl. No.: 18/854,531

(22) PCT Filed: Apr. 5, 2023

(86) PCT No.: PCT/EP2023/058996

§ 371 (c)(1),
(2) Date: Oct. 5, 2024

(87) PCT Pub. No.: WO2023/194471

PCT Pub. Date: Oct. 12, 2023

(65) Prior Publication Data

US 2025/0246794 A1 Jul. 31, 2025

(30) Foreign Application Priority Data

Apr. 6, 2022 (DE) ..................... 10 2022 108 255.5

(51) Int. Cl.
*H01Q 1/00* (2006.01)
*H01Q 1/22* (2006.01)
(Continued)

(52) U.S. Cl.
CPC ............... *H01Q 1/22* (2013.01); *H01Q 1/007* (2013.01); *H01Q 1/42* (2013.01); *H01Q 1/526* (2013.01); *H01Q 9/0407* (2013.01)

(58) Field of Classification Search
CPC ............ H01Q 1/22; H01Q 1/42; H01Q 1/526; H01Q 1/007; H01Q 9/0407; H01Q 21/28
See application file for complete search history.

(56) References Cited

U.S. PATENT DOCUMENTS 9,215,819 B2 12/2015 Schnekenburger et al.
9,259,591 B2 2/2016 Brown et al.
(Continued)

FOREIGN PATENT DOCUMENTS

DE 202012005808 U1 10/2012
DE 202012104438 U1 12/2012
(Continued)

OTHER PUBLICATIONS

Search Report received in German Application No. 10 2022 108 255.5 dated Jan. 5, 2023, with translation, 11 pages.
(Continued)

*Primary Examiner* — Awat M Salih
(74) *Attorney, Agent, or Firm* — Christoher A. Rothe; CM Law

(57) ABSTRACT

A medical device has a housing with a front plate. A wireless communication unit is formed in the housing and has at least one antenna. The housing includes at least one EMC-proof housing portion and at least one EMC-permitting housing portion. The at least one antenna is formed in the at least one EMC-permitting housing portion within the housing.

15 Claims, 3 Drawing Sheets

(51) Int. Cl.

| | |
|---|---|
| ***H01Q 1/42*** | (2006.01) |
| ***H01Q 1/52*** | (2006.01) |
| ***H01Q 9/04*** | (2006.01) |

(56) References Cited

U.S. PATENT DOCUMENTS

| | | | | |
|---|---|---|---|---|
| 10,944,168 | B2 * | 3/2021 | Frischke | H01Q 1/273 |
| 11,207,025 | B1 | 12/2021 | Trapero Martin et al. | |
| 2013/0201651 | A1 * | 8/2013 | Schnekenburger | H01Q 17/00 361/818 |
| 2017/0133752 | A1 | 5/2017 | Choi et al. | |
| 2018/0131086 | A1 | 5/2018 | Frischke et al. | |
| 2020/0295435 | A1 | 9/2020 | Yamagishi et al. | |
| 2023/0120949 | A1 * | 4/2023 | Schwarz | H01Q 21/06 343/702 |

FOREIGN PATENT DOCUMENTS

| | | | |
|---|---|---|---|
| DE | 202018103164 | U1 | 9/2019 |
| EP | 3299044 | A1 | 3/2018 |

OTHER PUBLICATIONS

Search Report received in International Application No. PCT/EP2023/058996 dated Jun. 29, 2023, with translation, 5 pages.
Written Opinion received in International Application No. PCT/EP2023/058996 dated Jun. 29, 2023, with translation, 12 pages.
Office Action received in European Application No. 23 717 157.4 dated Feb. 12, 2026, with translation, 12 pages.

* cited by examiner

ELECTRICAL MEDICAL DEVICE COMPRISING AN ANTENNA

CROSS-REFERENCE TO RELATED APPLICATIONS

This application is the United States national stage entry of International Application No. PCT/EP2023/058996, filed on Apr. 5, 2023, and claims priority to German Application No. 10 2022 108 255.5, filed on Apr. 6, 2022. The contents of International Application No. PCT/EP2023/058996 and German Application No. 10 2022 108 255.5 are incorporated by reference herein in their entireties.

FIELD

The present disclosure relates to an electrical medical device comprising an antenna for wireless communication.

BACKGROUND

In the course of digitalization and due to ever-increasing requirements for trackability and documentation in medicine, medical devices are configured or connected with communication devices that receive and send data from the medical device. The communication device may be configured as a wireless communication device so that such medical devices can be used flexibly and still be able to communicate and exchange data with other individual apparatuses, apparatus systems and also with hospital information systems as well as external IT systems (servers, clouds and the like) located in the same environment.

EMC regulations (electromagnetic compatibility regulations) place high demands on electrical medical apparatuses and devices with regard to emissions and immissions in order to ensure safe and reliable operation of electrical medical apparatuses and devices. For this purpose, the electrical medical apparatuses and devices are configured with 'radio-tight' or EMC-proof apparatus housings.

One example of such regulations is the EN 60601-1-2:2015+A1:2021 standard, which formulates EMC requirements for medical electrical appliances.

In order to still be able to communicate wirelessly, radio antennas of the communication device are connected to the medical device from the outside in the state of the art. For example, in the state of the art, the antennas are mounted in antenna connectors configured for the antennas in the apparatus housing, or external communication devices are provided, which are connected to the medical device via a cable.

A disadvantage of the prior art is that antennas that can be contacted from the outside may be forgotten, especially when preparing for an operation. In addition, such antennas may be damaged or broken off due to protruding from the apparatus housing during transportation of the medical device. Another disadvantage is that the externally contacted antennas create edges and joints that are difficult to clean, which can act as a breeding ground for germs and bacteria and thus jeopardize patient health and safety, especially in an operating environment.

In principle, it would be possible to provide additional compartments on the outside of the housing to accommodate antennas. It would also be possible to extend the housing on one side to create an internal compartment for an antenna. Although this would eliminate the above problems, it would increase the overall dimensions of the apparatus. In addition, the manufacturing effort would be increased and thus the manufacturing costs would rise.

SUMMARY

Accordingly, the object of the present disclosure is to eliminate or at least reduce the disadvantages of the prior art. Specifically, the object of the present invention is to provide an electrical medical device, in particular a table unit, which fulfills the EMC regulations without the disadvantages of an externally contacted antenna and/or the problems resulting from increasing housing dimensions.

The basic idea of the invention is substantially to identify a position within the housing of a medical electrical apparatus in the form of a table unit (e.g. infusion or syringe pump or similar devices), which

- is suitable for accommodating/installing one or more antennas in terms of its spatial conditions,
- has little or no shielding to the outside, and
- can be shielded or is shielded off from the rest of the housing space.

In other words, the idea of the inventive idea is to shield an externally unshielded or poorly shielded region within the already existing housing from the inside, and to equip the housing region thus shielded from the inside with at least one antenna for data communication to the outside of the housing. This at least one antenna may be wired to electronics inside the housing but outside this region and can thus be shielded from the at least one antenna.

As a result, it has been found that, for example, the housing front plate of such a medical apparatus (device) in the form of a table unit usually has displays and/or operating elements and therefore has little or no shielding effect, at least in these regions. This means that a compartment separated from the rest of the housing space by shielding is predestined to accommodate at least one antenna directly behind such a housing front plate. Housing parts may also protrude over side or rear walls/rear plates and may therefore lie outside the housing-internal shielding. These protruding housing parts may then be used to accommodate at least one antenna.

Specifically, the object is thus solved by a medical device or a medical apparatus in the form of a table unit with a housing containing a front plate and/or a rear plate and a wireless communication unit, which is configured or arranged in (within) the housing and which has at least one antenna. The housing contains/comprises at least one substantially EMC-proof housing portion (in which the communication unit is arranged with the exception of the antenna) and at least one EMC-permitting housing portion. The at least one antenna of the wireless communication unit is configured or arranged in the at least one EMC-permitting housing portion within the housing.

A table unit is understood to be a medical device with a closed housing that is suitable for operation on a surface, such as a table, or inserted/installed in a rack or something similar. The table unit may be, for example, a motor control device, a pump or the like, which is operated individually or as a group in the rack.

In other words, the medical device in the form of the table unit contains the preferably cuboid housing, which has a front plate facing an operator and/or a rear plate facing away from an operator. The wireless communication unit and the at least one antenna connected to the wireless communication unit (as a functional component thereof) are configured or arranged in the housing. Furthermore, essential (electrical) components for the function of the medical device are configured or arranged in the housing. The housing contains (comprises spatially) the at least one EMC-proof housing portion, which is configured, for example, from metal or metallized plastic components. EMC-proof in this case means that electromagnetic waves, such as light or high-energy microwaves, cannot pass through the EMC-proof housing portion. Metallized plastic components can mean both plastic parts that are coated with a metal layer as well as plastic parts that contain metal particles incorporated into the plastic. The components essential for the function of the medical device are preferably spatially surrounded by the at least one EMC-proof housing portion. In addition to the at least one EMC-proof housing portion, the housing spatially contains/comprises at least one EMC-permitting housing portion. In this case, EMC-permitting means that electromagnetic waves, in particular radio waves, can pass through the EMC-permitting housing portion. The radio waves may be Bluetooth, WLAN/radio network according to an IEEE-802.11 standard or any other type of radio waves that are configured to transmit data wirelessly. The antenna connected to the wireless communication unit by cable is provided and configured to receive and/or transmit the radio waves. The antenna is arranged in close proximity to the EMC-permitting housing portion in an interior of the housing.

By forming the housing with at least one EMC-proof housing portion, the components relevant for EMC can be reliably protected from electromagnetic radiation and thus from impairment of their function by electromagnetic radiation.

By forming/placing the at least one antenna in the interior of the housing, the housing may be configured with a surface that is as flat as possible and beads and edges in which dirt, germs and bacteria can adhere and multiply can be avoided. Damage to and/or forgetting of the antennas, for example before the start of surgery, can also be prevented. Since the at least one antenna is configured in the at least one EMC-permitting housing portion, reliable functioning of the wireless communication unit can be guaranteed.

Accordingly, the core of the invention is to form the electrical medical device in the form of the table unit both with the at least one EMC-permitting housing portion and with the at least one EMC-proof housing portion, wherein the at least one antenna of the wireless communication unit is configured/placed in the at least one EMC-permitting housing portion.

In a first aspect, the at least one antenna may be shielded in a direction toward a housing interior with a shielding sheet.

In other words, the at least one antenna may be enclosed by the shielding sheet and the EMC-permitting housing portion, wherein the shielding sheet shields the at least one antenna from the housing interior. The shielding sheet may be configured from metal or metallized plastic components.

The shielding sheet can prevent electromagnetic radiation from penetrating from an environment surrounding the medical device into the interior of the housing through the at least one EMC-permitting housing portion and the at least one antenna and restricting or disrupting the function of the components essential for the function of the medical device and thus endangering patient safety. In addition, electromagnetic radiation emitted by the at least one antenna can also be prevented from penetrating into the interior of the housing and restricting or interfering with the function of the components that are essential for the function of the medical device, thereby endangering patient safety.

In a further aspect, the at least one antenna and the wireless communication unit may be connected to each other by a cable guided through a hole in the shielding sheet.

In other words, the shielding sheet may have a cable passage in the form of the hole. A diameter of the hole may correspond substantially to a cable diameter. Alternatively, the diameter of the hole may be slightly larger than the cable diameter.

By designing the cable guide in this way, it can be ensured that there is no permeability in the EMC shielding due to the cable guide. This reliably prevents the essential components of the medical device from being restricted or disrupted in their function.

In a further aspect, the at least one EMC-permitting housing portion may be configured in a frame of the housing and the at least one antenna may preferably be configured in a frame indentation of the frame.

In other words, the housing may have the frame configured on the (outer) edges of the housing. In particular, the frame may protrude/project from the housing. The frame may be made entirely or partially from the EMC-permitting material and thus form the EMC-permitting housing portion. The frame may preferably contain frame indentations configured to match the geometry of the antenna, which are provided and configured to accommodate the at least one antenna. The frame may also be configured exclusively in the frame indentations of the EMC-permitting housing portion.

By forming the EMC-permitting housing portion in the frame, manufacturing costs for the housing may be reduced. In addition, in this way the at least one antenna can be arranged in a favorable position for transmitting and receiving the radio waves. By providing a frame indentation, the at least one antenna can be fixed in a form-fitting manner in the frame or in the EMC-permitting housing portion. In this way, the at least one antenna can be prevented from slipping and constant reception and transmission power can be guaranteed.

In a further aspect, the medical device in the form of the table unit may contain a display unit, preferably in the form of a screen, in the front plate, and the at least one antenna may be configured/arranged on an inner surface of the front plate facing the housing interior.

In other words, the at least one antenna may be configured on a rear side of the front plate. Preferably, the at least one antenna may be configured on a rear side of the display unit.

When the medical device in the form of the table unit is used in everyday hospital life, it is normally/regularly aligned with the front plate containing the display unit in a direction toward the center of the room so that a user can easily read content that is output via the display unit or, if the display unit is a touch-sensitive screen, so that the user can make settings on the medical device. If the at least one antenna is configured on the front plate, it is ensured that the antenna is positioned as far as possible in the direction toward the center of the room, which improves the reception and transmission power of the antenna and thus of the wireless communication unit.

In a further aspect, the front plate may be made of glass, among other things, and the at least one antenna can be firmly bonded to the front plate.

In other words, the front plate, in particular in a region of the display unit and/or in a region in which the at least one antenna is fixed to the front plate, may be made of a glass material. The at least one antenna may preferably be bonded to the front plate over a large area.

Since glass is a material through which radio waves can pass, the reception and transmission performance can be improved. By bonding the at least one antenna to the front plate, it can be ensured that the at least one antenna does not move away from a provided antenna position.

In a further aspect, the at least one antenna may be configured in a front frame portion of the frame, preferably in the frame indentation, below the front plate.

In other words, the frame may form the front frame portion, which is arranged below the front plate. The at least one antenna may be configured in the front frame portion arranged substantially on a plane of a bottom of the medical device.

When using the medical device in the form of the table unit, it is normally aligned with the front plate containing the display unit in a direction toward the center of the room so that the user can easily read content that is output via the display unit. If the at least one antenna is configured in the front frame below the front plate, it is ensured that the antenna is positioned as far as possible in the direction toward the center of the room, which improves the reception and transmission performance. In addition, such an arrangement of the at least one antenna ensures that the housing portion configured from the EMC-permitting material is arranged as far away as possible from the components essential for the function of the medical device.

In a further aspect, the at least one antenna may be configured to be planar and may be aligned substantially normal to the front plate.

In other words, the at least one antenna may be oriented substantially parallel to the bottom. Such an arrangement allows the medical device to be as compact as possible.

In a further aspect, the at least one antenna may be configured in a rear-side frame portion, preferably in the frame indentation, which surrounds a rear side of the housing opposite the front plate, and the rear-side frame portion may be configured at a greater distance from the front plate than the rear side.

In other words, the rear-side frame portion may at least partially encompass the rear side of the housing and project from the rear side in a direction normal to the rear side so that the rear-side frame portion forms the portion of the housing furthest from the front plate. A frame indentation for receiving the at least one antenna may optionally be configured in the rear-side frame portion. Preferably, the rear-side frame portion may form a U-shape open toward a cover plate of the medical device.

By forming the at least one antenna in the rear-side frame portion protruding from the housing, the receiving and transmitting performance of the at least one antenna can be improved. In particular, the protruding portion can prevent or at least reduce impairment of the receiving and transmitting performance by the housing itself.

In a further aspect, the at least one antenna may be configured to be planar and is aligned substantially parallel to the front plate.

In a further aspect, at least two antennas may be configured in the medical device, wherein the two antennas may be arranged at an angle of 90° to each other.

Such an arrangement can maximize the radiation area covered by the two antennas.

In a further aspect, the at least two antennas may be arranged on different EMC-permitting housing portions. For example, the first antenna may be arranged below the front plate and the second antenna may be arranged in the rear-side frame portion protruding from the housing.

In a further aspect, a plurality of antennas may be configured in the housing.

In a further aspect, the at least one EMC-permitting housing portion of the housing may be smaller than the at least one EMC-proof housing portion of the housing.

In a further aspect, an entirety of the EMC-permitting housing portions of the housing may be smaller than an entirety of the EMC-proof housing portions of the housing.

In a further aspect, the data transferred via the at least one antenna and the communication unit may be statistics, control programs, treatment protocols and the like.

In a further aspect, the at least one antenna may be a W-LAN antenna.

In a further aspect, the at least one antenna may be a Bluetooth antenna.

In a further aspect, the at least one antenna may be a mobile radio antenna.

In a further aspect, the frame may be made of plastic.

In a further aspect, the at least one antenna may be configured above the display unit on the front plate In a further aspect, at least two antennas may be configured in the medical table unit.

In a further aspect, the two antennas may be arranged at an angle of 90° to each other.

In a further aspect, the at least two antennas may be arranged on different, preferably spaced apart, EMC-permitting housing portions.

In a further aspect, the housing may contain a bottom forming a stand space of the medical table unit.

In a further aspect, the housing may contain a cover plate and the front plate may be substantially arranged between the cover plate and the bottom.

DETAILED DESCRIPTION

Configuration examples of the present disclosure are described below on the basis of the associated Figures.

Figure 1:
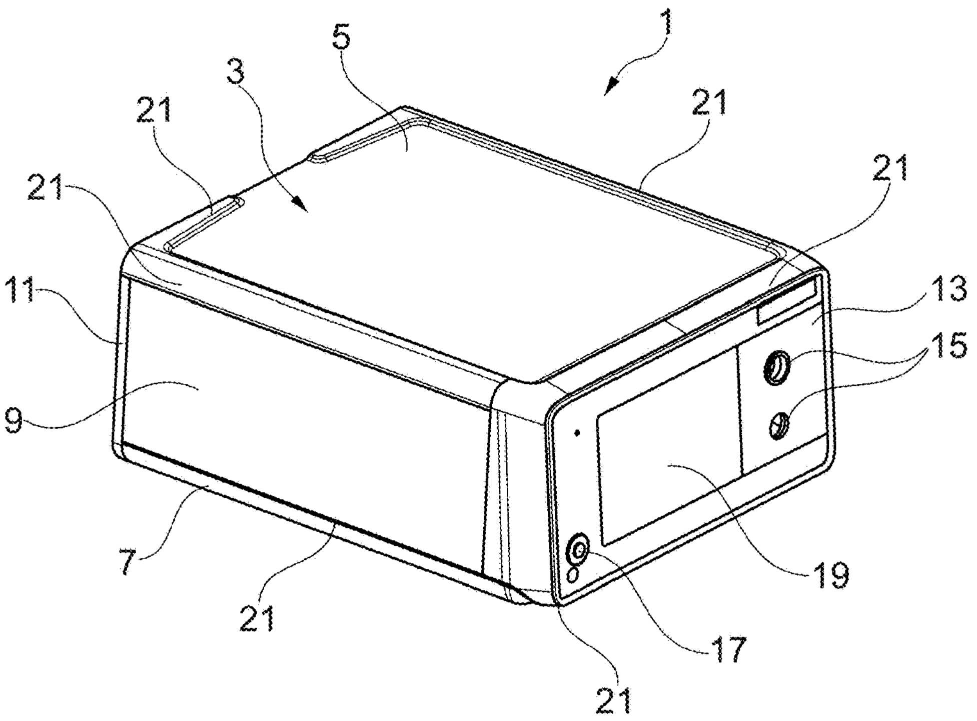
FIG. 1 is a perspective view of a medical device in the form of a table unit according to the present disclosure.

FIG. 1 shows an electrical medical device 1 in the form of a table unit, here in the form of a motor control device, for example for driving and controlling a medical drilling machine, with a housing 3. The housing 3 substantially has a cuboid geometry and includes a cover plate 5 on an upper side, a bottom 7 on a lower side, two sidewalls 9, a rear side 11 and a front plate 13. The sidewalls 9, the rear side 11 and the front plate 13 are substantially arranged between the cover plate 5 and the bottom 7. The front plate 13 contains terminals 15, a function button 17 and a screen 19. Frame geometries 21 are configured at the edges of the housing 3. Edges are to be understood as transitions between the cover plate 5, the sidewalls 9, the rear side 11, the front plate 13 and the bottom 7. The bottom 7 forms a stand space of the medical device 1. The sidewalls 9 and the rear side 11 are oriented substantially normal to the cover plate 5 and the bottom 7.

The housing 3 is substantially configured from an EMC-proof material. A metal or a metallized plastic (TSG material) or the like can be used as EMC-proof material. The frame geometries 21 are EMC-permitting in defined regions. This means that the frame geometries 21 are not metallized in the defined regions or are not configured from metal.

Figure 2:
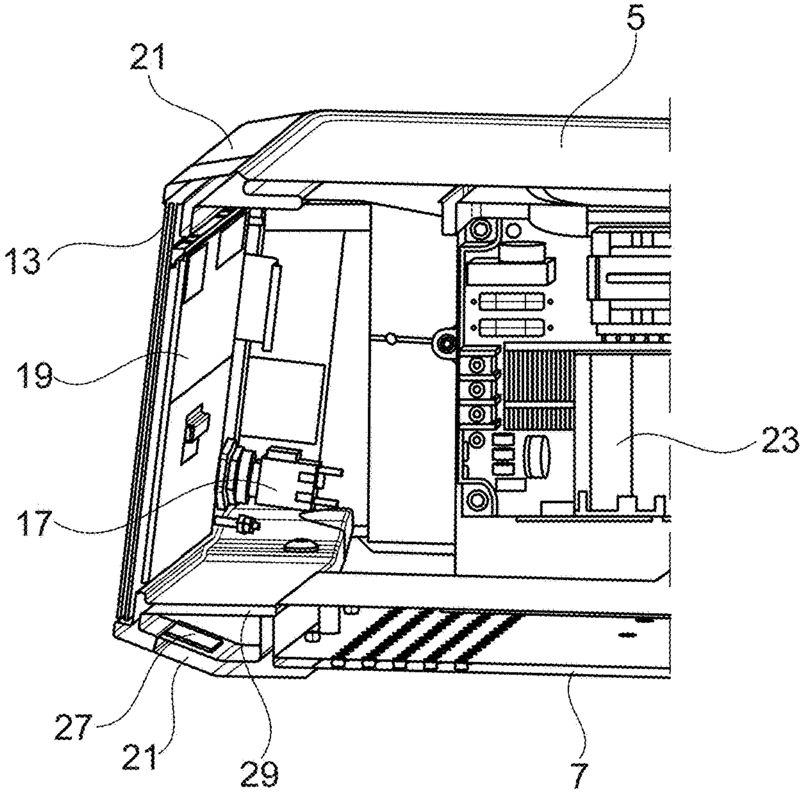
FIG. 2 is a first sectional view of the medical device according to a first embodiment.

FIG. 2 shows the electrical medical device 1 in a first section in a height direction of the medical device 1 in a first embodiment. The height direction is to be understood as a direction between the bottom 7 and the cover plate 5. The section is arranged parallel to the sidewalls 9.

The screen 19 is embedded in the front plate 13. The front plate 13 is angled for better readability of the screen 19. In other words, the front plate 13 is oriented at a (slight) angle of inclination to a normal of the cover plate 5 and the bottom 7.

Electrical components 23, which are essential for the function of the medical device 1, are configured in an interior space enclosed by the housing 3. The EMC-proof housing 3 of the medical device 1 protects the electrical components 23 from being influenced or disturbed by electromagnetic interference from the environment surrounding the medical device. On the other hand, the EMC-proof housing 3 also prevents the electrical components 23 from emitting electromagnetic interference to the environment.

Figure 3:
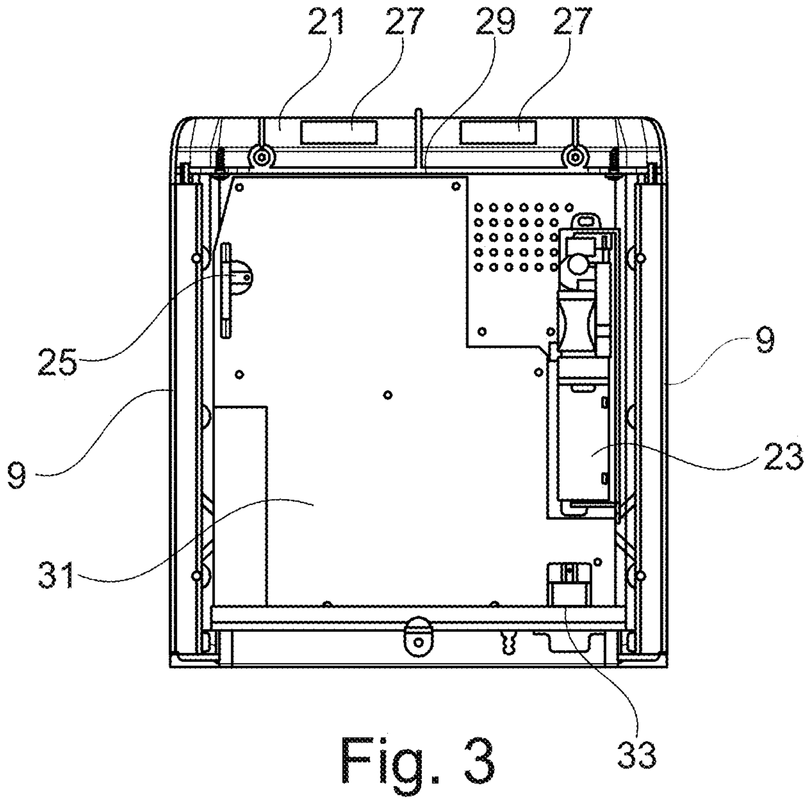
FIG. 3 is a second sectional view of the medical device according to the first embodiment.
Figure 4:
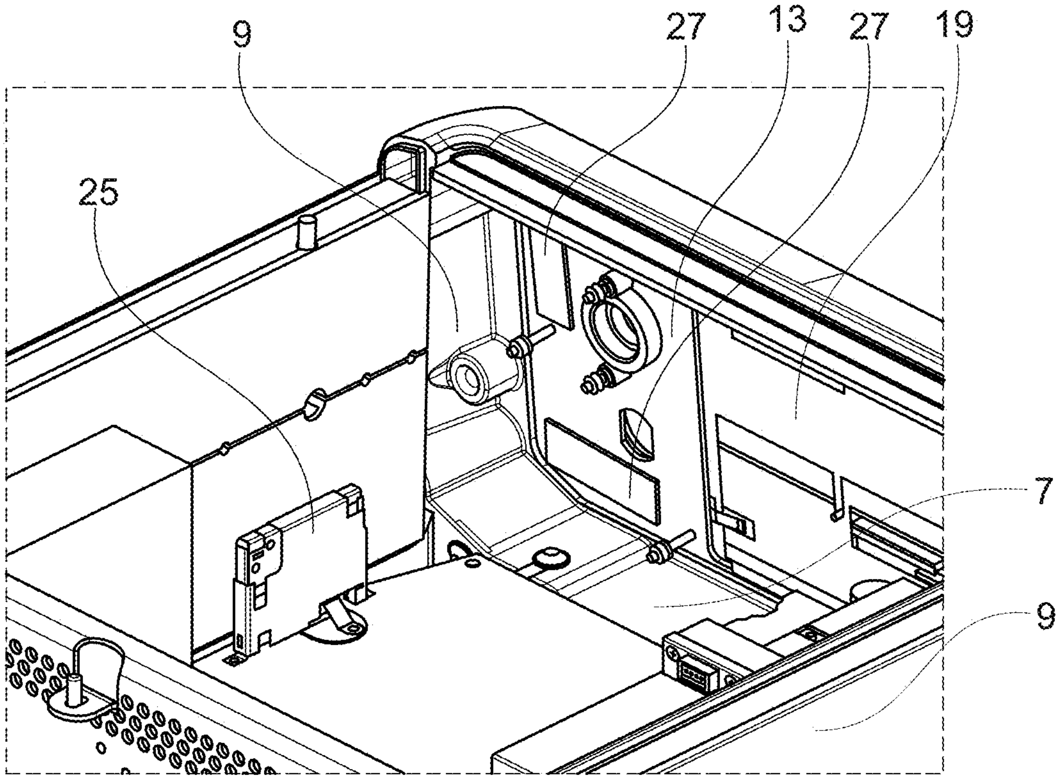
FIG. 4 is a perspective view of the medical device according to a second embodiment without a cover plate.

The medical device 1 further includes a wireless communication module 25 (see FIG. 3 or FIG. 4). The wireless communication module 25 is provided and configured to wirelessly exchange/transfer data via antennas 27 between the medical device 1, in particular the electrical components 23 of the medical device 1, and individual apparatuses, apparatus systems, hospital information systems and external IT systems (cloud, online connection to the apparatus manufacturer and the like) located in the environment of the medical device 1. The communication module 25 is connected to the antennas 27 via cable (not shown). In the first embodiment shown in FIG. 2, the antennas 27 are configured below the screen 19 in the frame geometry 21. In other words, in the first embodiment, the antennas 27 are configured substantially parallel to the bottom 7 in frame indentations. The frame indentations are free spaces in the frame geometry 21. In a direction away from the interior of the medical device 1, the antennas 27 are limited exclusively by the frame geometry 21, which is permeable to electromagnetic radiation, in particular to radio waves emitted by the antennas 27. In a direction toward the interior of the medical device 1, the antennas 27 are shielded by shielding sheets 29. The shielding sheets 29 ensure that EMC protection of the electrical components 23 is also guaranteed through regions in which the antennas 27 are configured.

FIG. 3 shows the electrical medical device 1 in a second section in a direction parallel to the bottom 7 in the first embodiment. The communication module 25 is screwed to a mainboard 31 in the interior of the medical device 1 normal to the mainboard 31. The rear side 11 contains a power plug 33, which is connected to the mainboard 31 and supplies the electrical components 23 and the communication module 25 with electrical energy. The two antennas 27 of the first embodiment shown here are configured as far as possible from the interior of the medical device 1 in the frame geometry 21 of the front plate 13 below the screen 19. In this way, the largest possible radiation area can be ensured by the antennas 27. The two antennas 27 are glued to the frame geometry 21. In the first embodiment shown in FIG. 3, the antennas 27 are arranged substantially symmetrically to a center of the front plate 13.

FIG. 4 shows the electrical medical device 1 in a perspective view in a second embodiment, wherein the cover plate 5 is removed for better illustration. The two antennas 27 are attached to a rear side of the front plate 13. The rear side of the front plate 13 is a surface of the front plate 13 that faces the interior of the medical device 1. The antennas 27 are attached to the rear side of the front plate 13 via an adhesive. The front plate 13 is made of glass. The front plate 13 is thus permeable to electromagnetic radiation, in particular to radio waves, which are received and transmitted by the antennas 27. In the second embodiment, the antennas 27 are also shielded with shielding sheets in a direction toward the interior of the medical device 1. The shielding sheets are not shown in FIG. 4 for better illustration.

The two antennas 27 are fixed to the rear side of the front plate 13 at an angle of 90° to each other.

Figure 5:
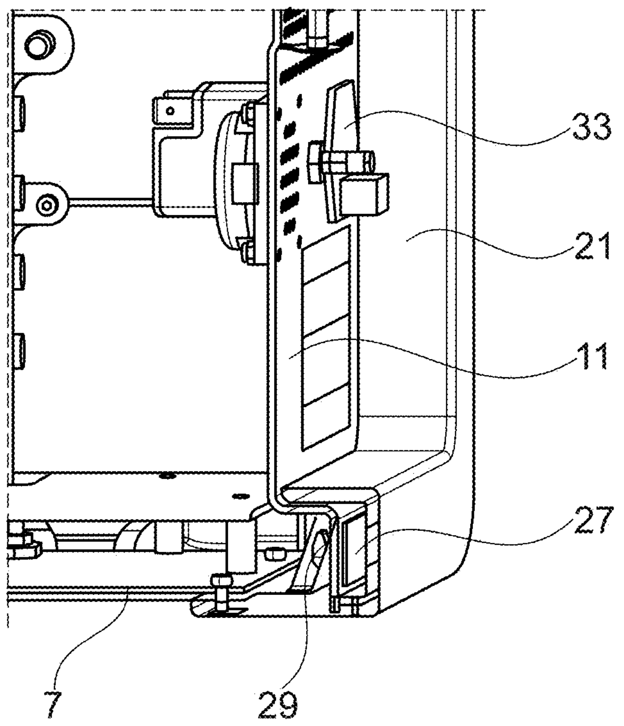
FIG. 5 is an enlarged sectional view of the medical device according to a third embodiment.

FIG. 5 shows the electrical medical device 1 in a section in the direction parallel to the side wall 9 in a third embodiment. More specifically, FIG. 5 shows an enlarged section of the cut in a rear portion of the medical device 1 near the rear side 11. The frame geometry 21 protrudes from the medical device 1 in a direction normal to the rear side 11. The frame geometry 21 frames the rear side 11 in a U-shape. In the frame geometry 21, the frame indentation is configured, which accommodates the antenna 27 between the frame geometry 21, which is permeable to the electromagnetic rays, in particular to the radio waves of the antenna 27, and the shielding sheet 29, which is impermeable to the electromagnetic rays, in particular to the radio waves of the antenna 27. The antenna is in an exposed position in relation to the rear side 11.

Figure 6:
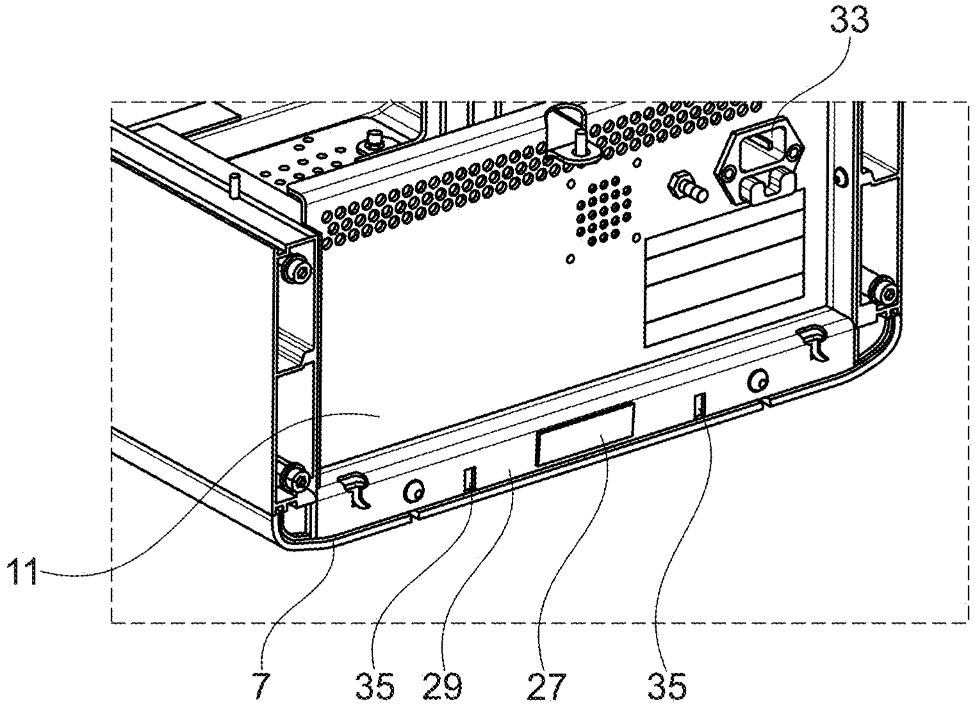
FIG. 6 is a perspective view of the medical device according to the third embodiment without a cover plate and without a rear frame geometry.

FIG. 6 shows the electrical medical device 1 in the third embodiment in a state in which the frame geometry 21 and the cover plate 5 are removed. The antenna 27 is aligned substantially parallel to the bottom 7. The antenna 27 is bonded to the shielding sheet 29. More precisely, the antenna 27 is glued to the shielding sheet 29 on a side of the shielding sheet 29 facing away from the interior of the medical device 1. The shielding sheet 29 includes cable passages 35 through which the cable connecting the antenna 27 to the communication unit 25 is routed without reducing the EMC protection of the electrical components 23 arranged in the interior of the medical device 1.

In another alternative embodiment, not shown, the antenna may be configured in the frame geometry between the side wall and the cover plate.

In another alternative embodiment, not shown, the antenna may be configured above the screen in the front plate.

The embodiments described here may be combined with each other in any combination.

LIST OF REFERENCE SIGNS

1 (electrical) medical device/medical table unit
3 housing
5 cover plate
7 bottom
9 side wall
11 rear side
13 front plate
15 terminal
17 function button
19 screen
21 frame geometry

23 electric component
25 communication module
27 antenna
29 shielding sheet
31 mainboard
33 power plug
35 cable passage

The invention claimed is:

1. A medical table unit comprising:
a closed housing containing a front plate; and
a wireless communication unit configured in the closed housing, with at least one antenna,
the closed housing containing at least one EMC-proof housing portion and at least one EMC-permitting housing portion,
the at least one antenna configured in the at least one EMC-permitting housing portion in an interior of the closed housing,
the at least one antenna comprising a first antenna and a second antenna,
the at least one EMC-permitting housing portion comprising a first EMC-permitting housing portion and a second EMC-permitting housing portion,
the first antenna being arranged on the first EMC-permitting housing portion, and
the second antenna being arranged on the second EMC-permitting housing portion so as to extend a radiation area covered by the first antenna and the second antenna.

2. The medical table unit according to claim 1, wherein the at least one antenna is shielded in a direction toward a housing interior with a shielding sheet.

3. The medical table unit according to claim 2, wherein the at least one antenna and the wireless communication unit are connected to each other by a cable guided through a hole in the shielding sheet.

4. The medical table unit according to claim 1, wherein the at least one EMC-permitting housing portion is configured in a frame of the closed housing and the at least one antenna is configured in a frame indentation.

5. The medical table unit according to claim 4, wherein the at least one antenna is configured in a front frame portion of the frame below the front plate.

6. The medical table unit according to claim 5, wherein the at least one antenna is configured to be planar and is aligned substantially normal to the front plate.

7. The medical table unit according to claim 4, wherein the at least one antenna is configured in a rear-side frame portion which surrounds a rear side of the closed housing opposite the front plate, and the rear-side frame portion is configured at a greater distance from the front plate than the rear side.

8. The medical table unit according to claim 4, wherein the frame is made of plastic.

9. The medical table unit according to claim 1, wherein the at least one antenna is configured to be planar and is aligned substantially parallel to the front plate.

10. The medical table unit according to claim 1, wherein the first antenna is arranged at an angle of 90° relative to the second antenna.

11. The medical table unit according to claim 1, wherein the closed housing includes a bottom forming a stand space of the medical table unit.

12. The medical table unit according to claim 11, wherein:
the closed housing contains a cover plate, and
the front plate is arranged between the cover plate and the bottom.

13. The medical table unit according to claim 1, wherein:
the medical table unit contains an operating or display unit in the front plate, and
the at least one antenna is configured on an inner surface of the front plate facing the interior of the closed housing.

14. The medical table unit according to claim 13, wherein the at least one antenna is configured above the operating or display unit in the front plate.

15. The medical table unit according to claim 1, wherein the front plate is made of glass and the at least one antenna is firmly bonded to the front plate.

* * * * *